US011059347B2

(12) United States Patent
Moore (10) Patent No.: US 11,059,347 B2
(45) Date of Patent: Jul. 13, 2021

(54) HVAC DOOR ACTUATION SYSTEM

(71) Applicant: DENSO International America, Inc., Southfield, MI (US)

(72) Inventor: Preston Moore, Farmington Hills, MI (US)

(73) Assignee: DENSO International America, Inc., Southfield, MI (US)

(*) Notice: Subject to any disclaimer, the term of this patent is extended or adjusted under 35 U.S.C. 154(b) by 163 days.

(21) Appl. No.: 16/192,264

(22) Filed: Nov. 15, 2018

(65) Prior Publication Data

US 2020/0156434 A1 May 21, 2020

(51) Int. Cl.
*B60H 1/00* (2006.01)
*B60H 1/24* (2006.01)
*B60H 1/34* (2006.01)
*B60H 1/32* (2006.01)

(52) U.S. Cl.
CPC ..... *B60H 1/00671* (2013.01); *B60H 1/00028* (2013.01); *B60H 1/242* (2013.01); *B60H 1/3227* (2013.01); *B60H 1/3421* (2013.01); *B60H 2001/00185* (2013.01); *B60H 2001/3471* (2013.01)

(58) Field of Classification Search
CPC combination set(s) only.
See application file for complete search history.

(56) References Cited

U.S. PATENT DOCUMENTS

2011/0284183 A1* 11/2011 Yamashita ......... B60H 1/00678
165/63
2017/0120721 A1* 5/2017 Zhang ................. B60H 1/0065

* cited by examiner

*Primary Examiner* — Steven B McAllister
*Assistant Examiner* — Elizabeth M. May
(74) *Attorney, Agent, or Firm* — Harness, Dickey & Pierce, P.L.C.

(57) ABSTRACT

A heating, ventilation, and air conditioning (HVAC) system including a plurality of airflow control doors. A plurality of door gears are in cooperation with the plurality of airflow control doors such that rotation of each one of the plurality of door gears actuates a different one of the plurality of airflow control doors to control airflow through the HVAC system. A selector gear is moveable to individually rotate each one of the plurality of door gears to selectively actuate different ones of the plurality of airflow control doors. A power gear rotates the selector gear.

12 Claims, 7 Drawing Sheets

HVAC DOOR ACTUATION SYSTEM

FIELD

The present disclosure relates to an HVAC door actuation system.

BACKGROUND

This section provides background information related to the present disclosure, which is not necessarily prior art.

Existing heating, ventilation, and air conditioning (HVAC) systems include a plurality of mode plates configured to control multiple pins, but only in pre-determined combinations that are dictated by having set grooves for each pin. This means that there is a limited number of output combinations that can be attained by using these plates. The plates and pins are part of door linkages, which control movement of airflow control doors of the HVAC case. While such existing linkages are suitable for their intended use, they are subject to improvement. For example, an improved way of actuating HVAC airflow doors having unlimited output combinations with minimal energy inputs would be desirable. This would remove the restriction of current HVAC systems caused by the use of a mode/control plate by allowing each output (and associated door) to be controlled independently. The present disclosure includes an HVAC system that advantageously overcomes these issues experienced with existing systems, and provides numerous additional advantages and unexpected results as explained in detail herein and as one skilled in the art will appreciate.

SUMMARY

This section provides a general summary of the disclosure, and is not a comprehensive disclosure of its full scope or all of its features.

The present disclosure includes a heating, ventilation, and air conditioning (HVAC) system including a plurality of airflow control doors. A plurality of door gears are in cooperation with the plurality of airflow control doors such that rotation of each one of the plurality of door gears actuates a different one of the plurality of airflow control doors to control airflow through the HVAC system. A selector gear is moveable to individually rotate each one of the plurality of door gears to selectively actuate different ones of the plurality of airflow control doors. A power gear rotates the selector gear.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
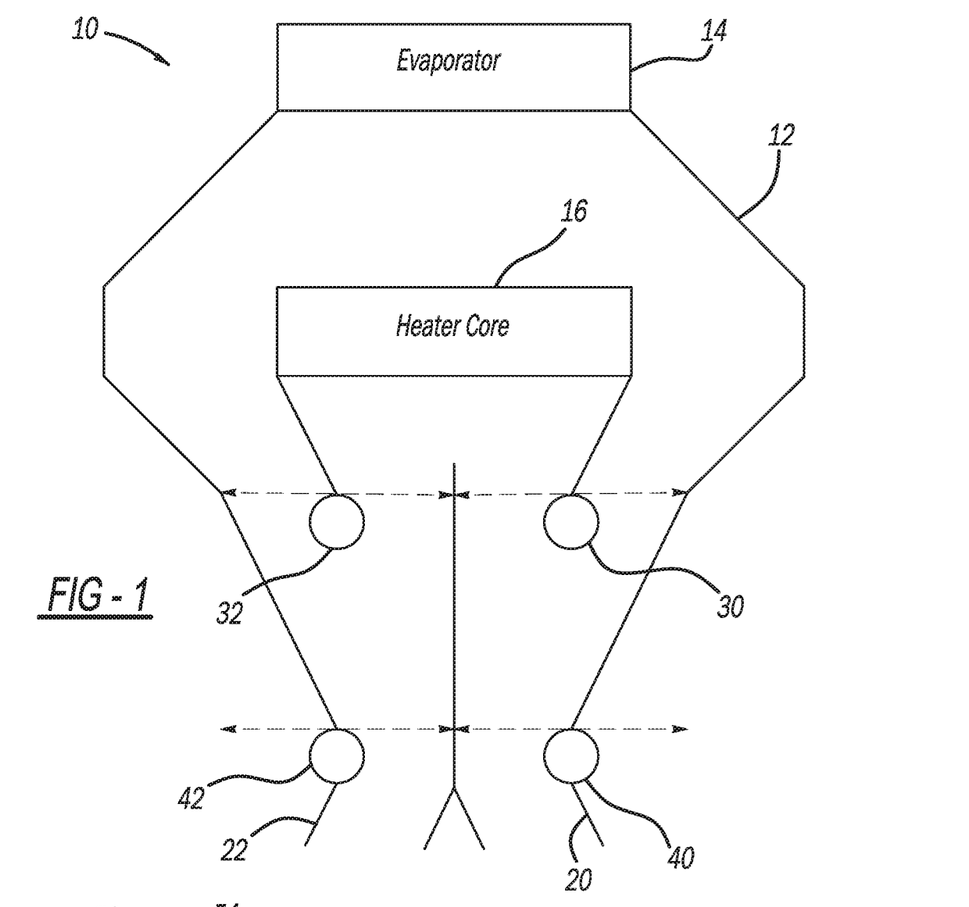
FIG. 1 illustrates a heating, ventilation, and air conditioning (HVAC) system in accordance with the present disclosure.

FIG. 1 illustrates a heating, ventilation, and air conditioning (HVAC) system in accordance with the present disclosure at reference numeral 10. The HVAC system 10 may be configured for use with any suitable vehicle, such as any suitable passenger vehicle, commercial vehicle, mass transit vehicle, construction vehicle/equipment, military vehicle/equipment, recreational vehicle, watercraft, etc. The HVAC system 10 may also be configured for use with any suitable non-vehicular application as well.

The HVAC system 10 includes an HVAC case 12. An evaporator 14 and a heater core 16 are housed within the HVAC case 12. Although the HVAC system 10 is illustrated and described herein as including the evaporator 14, the evaporator 14 is optional and may not be included in all applications.

The HVAC case 12 defines a plurality of outlet ducts, through which airflow exits the HVAC case 12 and flows to various outlets of different zones of the vehicle through any suitable HVAC piping arrangement. As illustrated in the example of FIG. 1, the HVAC case 12 defines a face duct 20 and a foot duct 22. The face duct 20 directs airflow to face outlets at different zones of the passenger cabin. The foot duct 22 directs airflow to foot outlets at different zones of the passenger cabin. In some applications, the HVAC case 12 may further define doors 20 and 22 as a defrost duct, which directs airflow to defrost outlets of the vehicle. The face duct 20, the foot duct 22, and the defrost duct variants are merely exemplary airflow ducts, and thus the HVAC case 12 may define any other suitable airflow ducts. For example, the HVAC case 12 may further define a rear airflow duct for directing airflow to a rear of a vehicle, such as an extended length vehicle.

The HVAC system 10 further includes a plurality of zone doors for regulating the temperature and volume of airflow exiting the HVAC case 12 and various vehicle outlets at different vehicle zones. In the example illustrated, the HVAC case 12 includes: a plurality of face, temperature regulation zone doors 30; a plurality of foot, temperature regulation zone doors 32; a plurality of face, airflow volume regulation zone doors 40; and a plurality of foot, airflow volume regulation zone doors 42. The plurality of face, temperature regulation zone doors 30 control the temperature of airflow flowing to various vehicle face outlets at different vehicle zones. The plurality of foot temperature regulation zone doors 32 control the temperature of airflow to various vehicle foot outlets at different vehicle zones. The plurality of face, airflow volume regulation zone doors 40 control the volume of airflow exiting the different vehicle face outlets at different vehicle zones. The plurality of foot, airflow volume regulation zone doors 42 control the volume of airflow exiting the different vehicular foot outlets at different zones.

Figure 2:
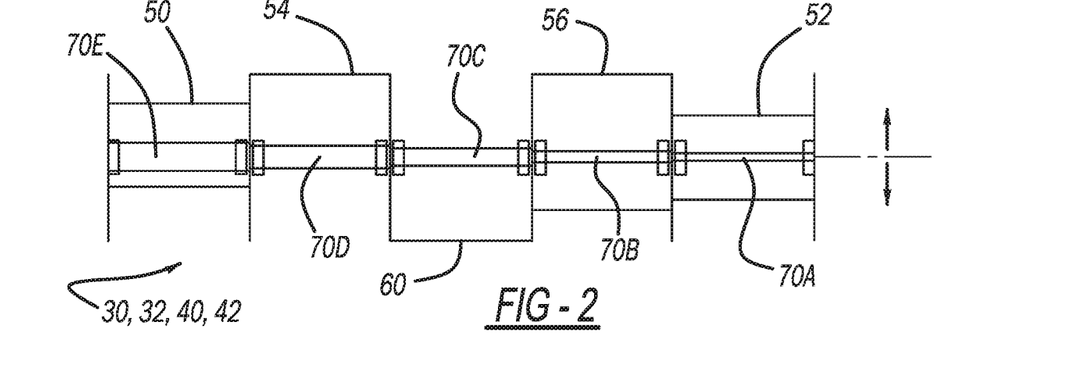
FIG. 2 illustrates exemplary zone doors of the HVAC system.

FIG. 2 illustrates an exemplary arrangement of zone doors, such as the zone doors 30, the zone doors 32, the zone doors 40, or the zone doors 42. Because all of the zone doors 30, 32, 40, and 42 will be the same or similar in most applications, only one set of exemplary zone doors is illustrated in FIG. 2. FIG. 3C illustrates two sets of the zone doors 30 and 32. The exemplary zone doors of FIG. 2 include a zone one door 50, a zone two door 52, a zone three door 54, and a zone four door 56. For applications that include a defrost mode, a defrost zone door 60 is included. The zone doors 50, 52, 54, 56, and 60 are rotated by different shafts 70A, 70B, 70C, 70D, and 70E, which are concentric and extend different distances. In the examples illustrated, shaft 70A is the longest and has the smallest diameter. The zone doors 50, 52, 54, 56, and 60 may be any suitable type of zone door, such as film doors.

Figure 3A:
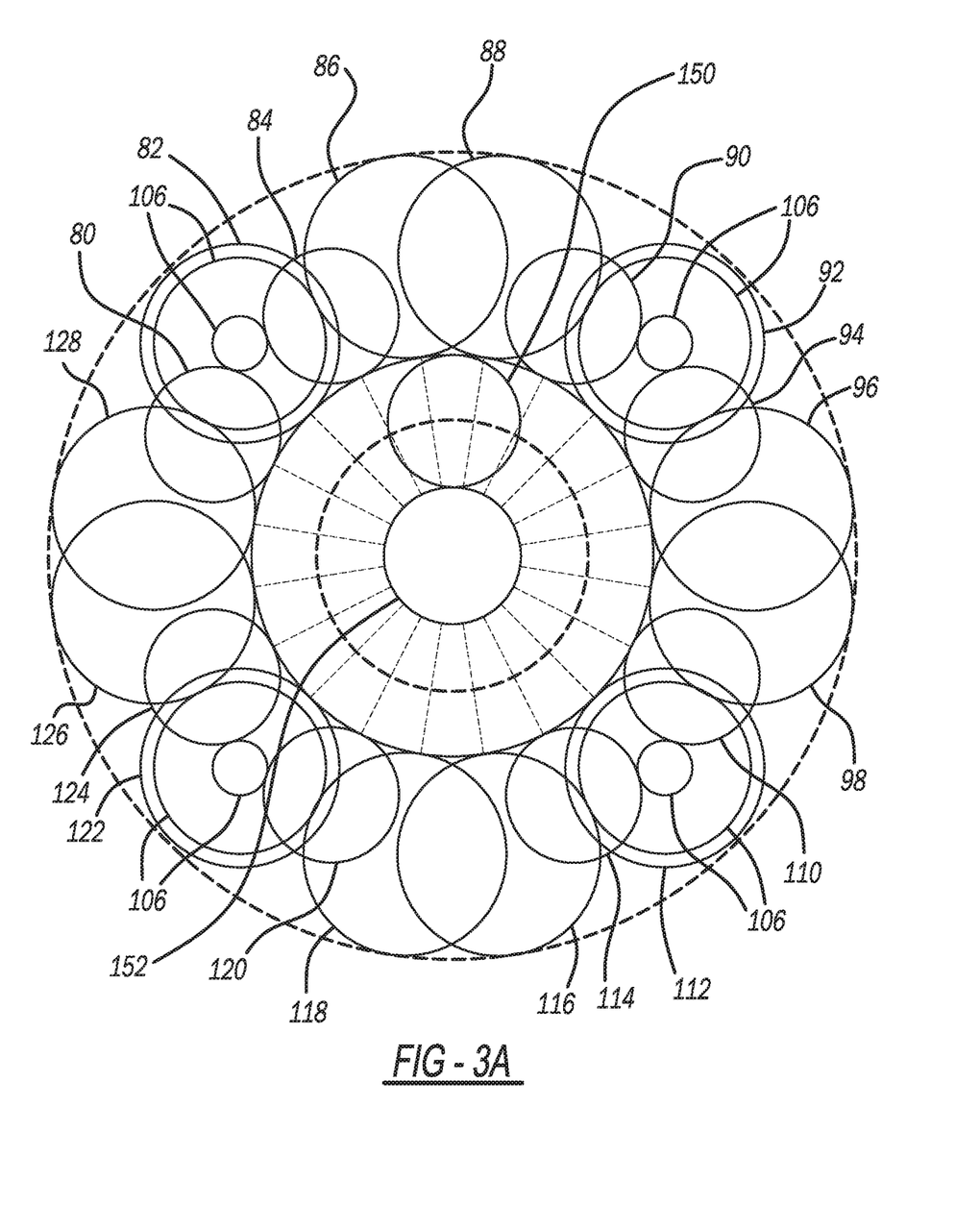
FIG. 3A is a plan view of door gears in accordance with the present disclosure, which actuate the zone doors of FIG. 2.
Figure 3B:
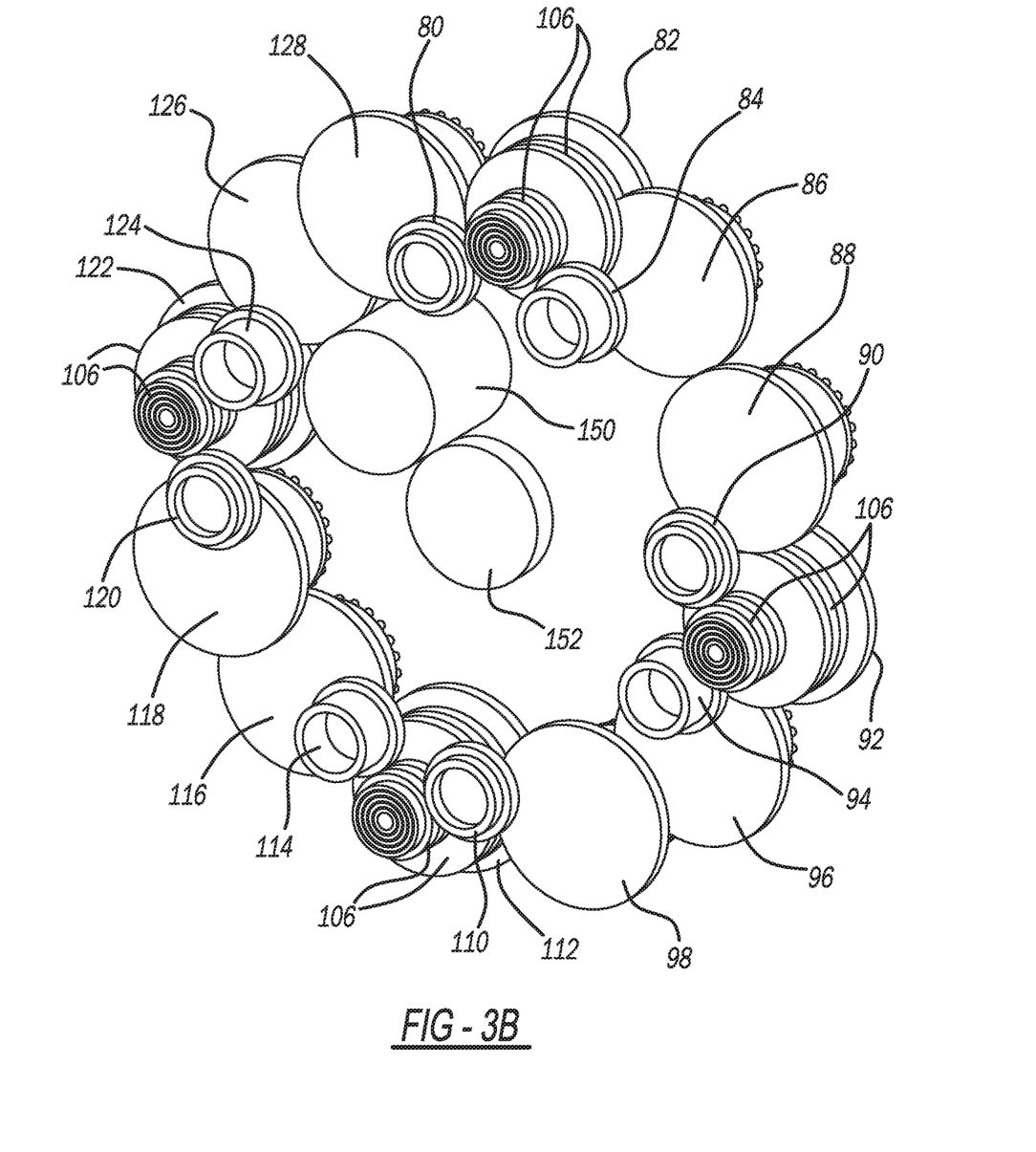
FIG. 3B is a perspective view of the door gears of FIG. 3A.
Figure 3C:
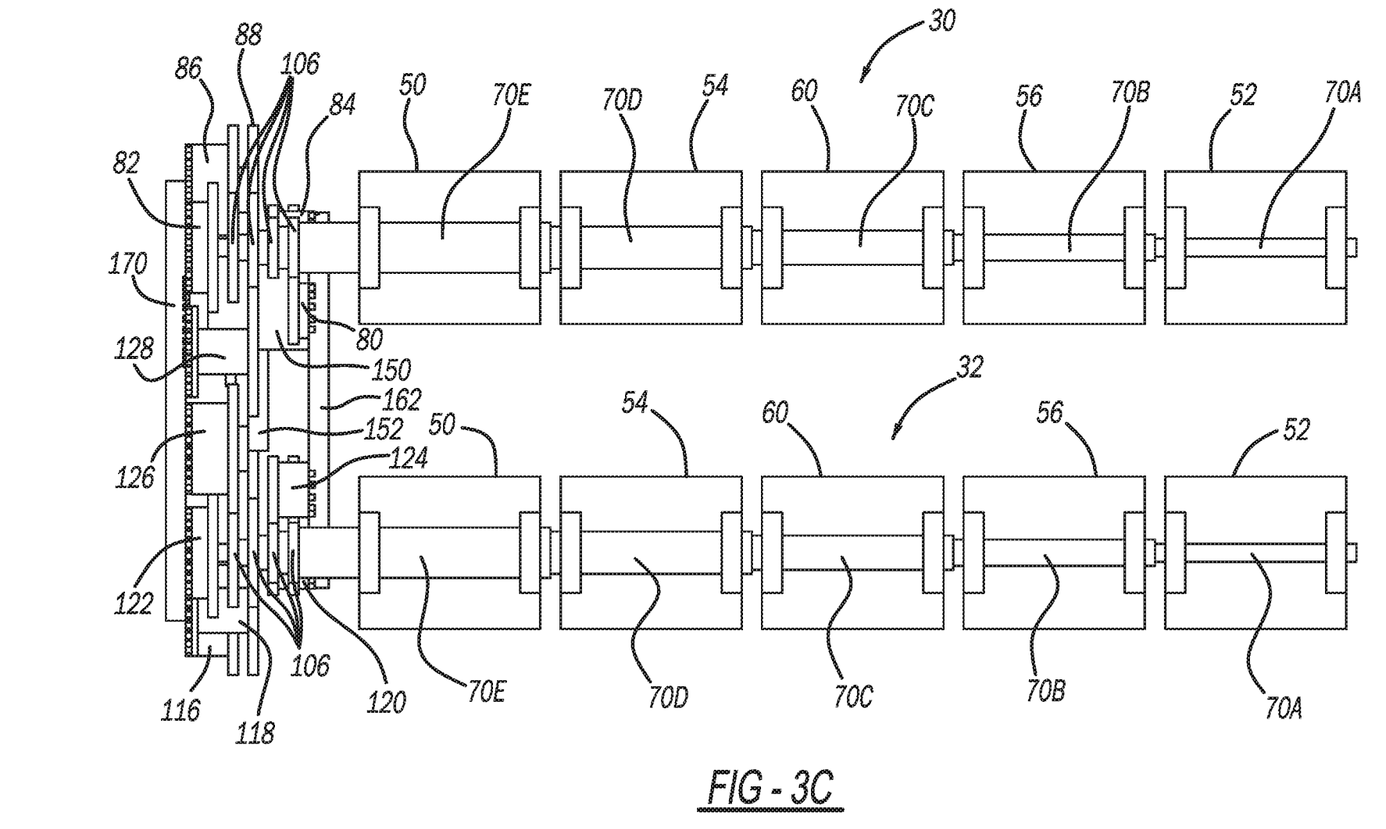
FIG. 3C is a side view of the door gears of FIG. 3A, and exemplary zone doors extending therefrom.

Each one of the zone doors is individually actuated by a different door gear and shaft (70A, 70B, 70C, 70D, and 70E), such as the door gears of FIGS. 3A, 3B, and 3C. Specifically, at least FIGS. 3A and 3B illustrate the following face, temperature regulation door zone gears: zone gear 80 (zone one); zone gear 82 (zone two); zone gear 84 (zone three); zone gear 86 (zone four); and defrost zone gear 128. At least FIGS. 3A and 3B illustrate the following face, airflow volume regulation door zone gears: zone gear 90 (zone one); zone gear 92 (zone two); zone gear 94 (zone three); zone gear 96 (zone four); and defrost zone gear 88. At least FIGS. 3A and 3B illustrate the following foot, airflow volume regulation door zone gears: zone gear 110 (zone one); zone gear 112 (zone two); zone gear 114 (zone three); zone gear 116 (zone four); and defrost zone gear 98. Also illustrated in at least FIGS. 3A and 3B are the following foot temperature regulation door zone gears: zone gear 120 (zone one); zone gear 122 (zone two); zone gear 124 (zone three); zone gear 126 (zone four); and defrost zone gear 116. Also included are a plurality of spacer gears 106. The door zone gears are arranged in a circle, such as in the form of planetary gears (see FIGS. 3A and 3B for example). Each one of the door zone gears is selectively rotated by a selector gear 150. The selector gear 150 is rotated by a power gear 152 (acts as a sun gear). The door zone gears mesh, directly or indirectly, with different ones of the shafts 70A, 70B, 70C, 70D, and 70E. The shafts 70A, 70B, 70C, 70D, and 70E rotate different ones of the zone doors 50, 52, 54, 56, and 60.

Figure 7:
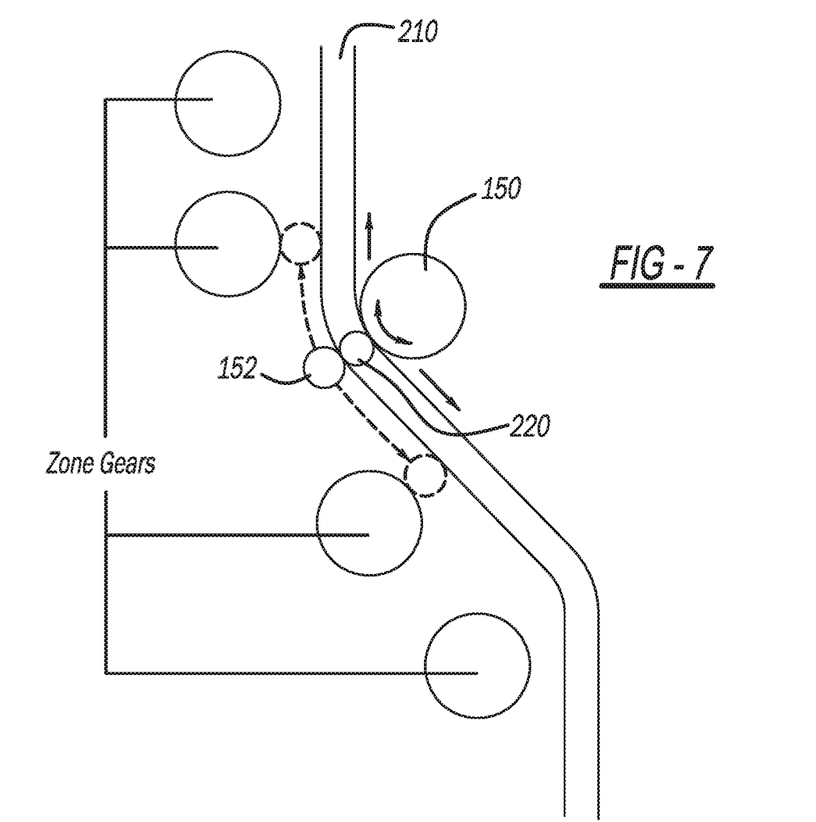
FIG. 7 illustrates a non-planetary arrangement of the HVAC system of the present teachings.
Figure 8:
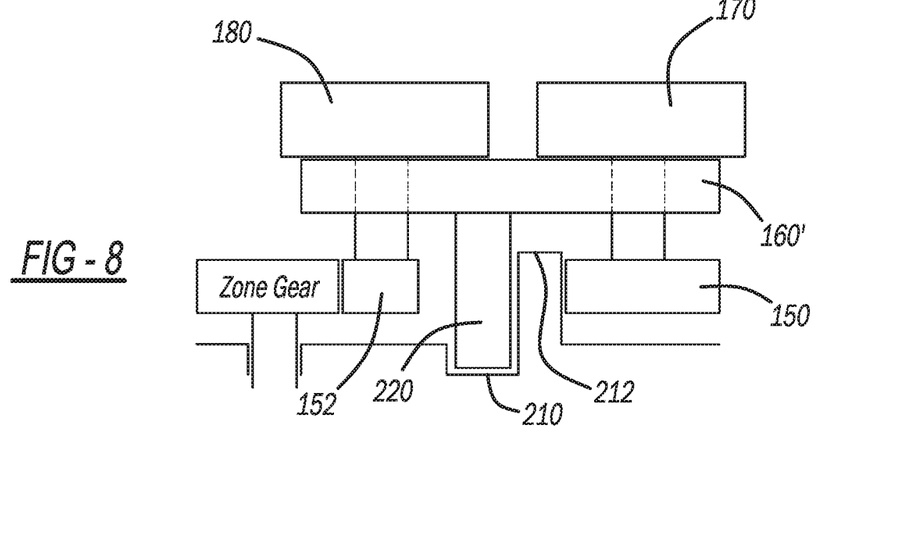
FIG. 8 is a schematic side view of the door gear arrangement of the non-planetary arrangement of FIG. 7.

A planetary arrangement is just one of many arrangements that can be used. A planetary version is illustrated in FIGS. 3A, 3B, and 3C, but is not intended to limit the scope of motion that the power and/or selector gears 152/150 can use to engage the zone gears. For example and as illustrated in FIGS. 7 and 8, the selector gear 150 can be used to move the power gear 152 along a set groove, track, or path 210, which allows the power gear 152 to directly touch and drive the zone gears. The selector gear 150 pushes the assembly of the selector plate 160' and attached servos and gears. This moves the power gear 152 into and out of alignment with each of the zone door gears. The selector gear 150 pushes against an extension 212 of the HVAC case 12 to drive the selector plate 160'. The selector plate 160' is mounted to a groove pin 220, which is seated in the groove, track, path 210.

Figure 4:
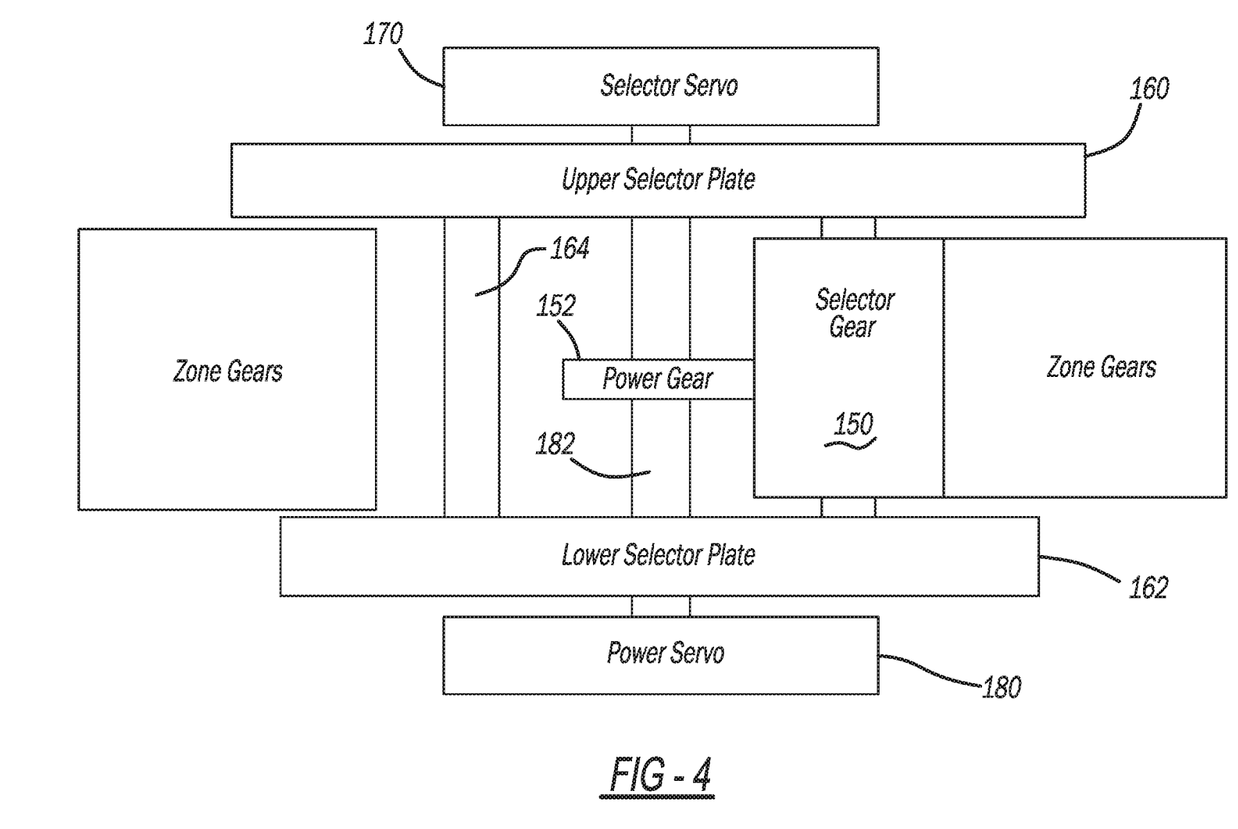
FIG. 4 is a schematic side view of the door gear arrangement of FIG. 3A.

With additional reference to FIG. 4, the selector gear 150 is mounted to an upper selector plate 160 and a lower selector plate 162. The upper and lower selector plates 160 and 162 are connected together in any suitable manner, such as by one or more pins 164. The upper and lower selector plates 160 and 162 are rotated in any suitable manner, such as by a selector servo 170. The selector servo 170 rotates the selector plates 160 and 162, thereby positioning the selector gear 150 into cooperation with any one of the door gears to selectively rotate any one the door gears. The selector gear 150 is rotated by the power gear 152, which is rotated in any suitable manner, such as by power servo 180. The power servo 180 rotates shaft 182, which rotates the power gear 152.

To actuate any of the zone doors 30, 32, 40, 42 (each of which include the exemplary zone doors 50, 52, 54, 56, and 60 illustrated in FIG. 2) the selector servo 170 rotates the selector plates 160, 162 to position the selector gear 150 at the zone gear that controls the particular zone door to be actuated. Once the selector gear 150 is meshed with the appropriate zone gear, the power servo 180 is activated to rotate the power gear 152, which in turn rotates the selector gear 150 and the zone gear meshed therewith. In this manner, the different zone doors 30, 32, 40, and 42 are opened or closed to provide the desired temperature and volume of airflow through the face duct 20, the foot duct 22, and/or the defrost duct 24. Advantageously, each one of the zone doors, such as the doors 50, 52, 54, 56, and 60 of FIG. 2 may be individually controlled (opened and closed to any degree) to provide specific temperature and volume control to the various different face, foot, and defrost zones. This is in contrast to previous systems having mode plates and multiple pins unable to provide such individual control.

Figure 5:
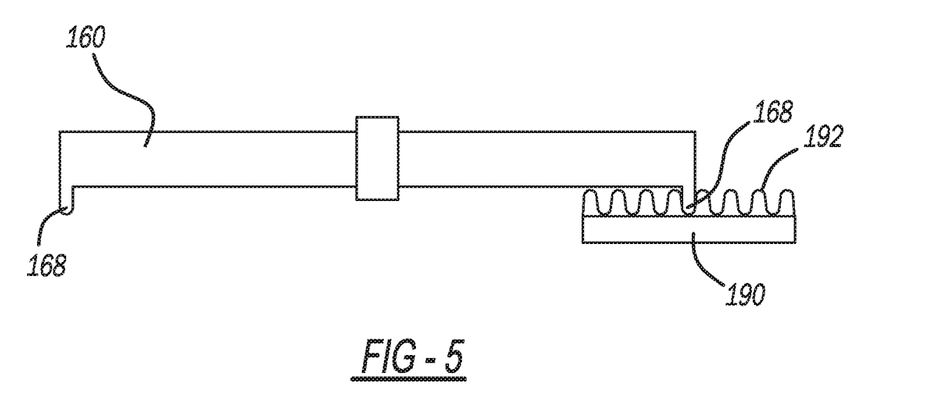
FIG. 5 is a side view of cooperation between a selector plate and locking teeth of one of the plurality of door gears.
Figure 6:
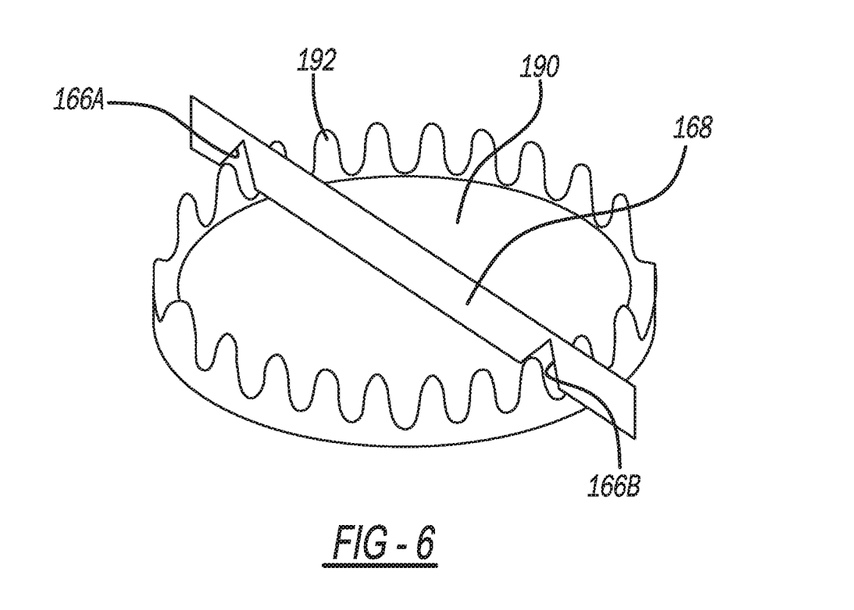
FIG. 6 is a perspective view of cooperation between the selector plate and locking teeth of one of the plurality of door gears.

With reference to FIGS. 5 and 6, the upper selector and lower plates 160 and 180 include a flange 168. The flange 168 defines openings 166A and 166B therein (see FIG. 6). Each one of the zone gears includes a base 190 extending therefrom parallel to a rotational axis of the zone gears. Each one of the bases 190 extends towards the upper selector plate 160, and has an extension that will interface with base 190 to block rotation. This could be achieved using stiff bristles, form fitting foam, or a plurality of locking teeth 192. These examples are not meant to limit the scope of the present disclosure. FIGS. 5 and 6 illustrate the exemplary base 190 that may be included with any of the zone gears. When the selector gear 150 is meshed with a particular zone gear, the openings 166A, 166B will be aligned with the locking feature 192 to allow the meshed zone gear to freely rotate. In contrast, the openings 166A, 166B do not align with the locking teeth 192 of any of the zone gears that the selector gear 150 is not meshed with. As a result, the upper and lower selector plates 160 and 180 (and the flange 168 thereof) prevent rotation of each one of the zone gears that the selector gear 150 is not meshed with to prevent undesired rotation of the zone gears.

The present teachings advantageously include only two servos in the form of the selector servo 170 and the power servo 180. As a result, the HVAC system 10 requires a minimal amount of energy, while at the same time providing for individual control of each one of the plurality of zone doors 30, 32, 40, and 42. The HVAC system 10 can meet any airflow volume, airflow distribution, and airflow temperature requirement that the evaporator 14, the heater core 16, and an associated blower can match. One skilled in the art will appreciate that the present disclosure provides for numerous additional advantages as well.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A heating, ventilation, and air conditioning (HVAC) system comprising:
   a plurality of airflow control doors;
   a plurality of door gears in cooperation with the plurality of airflow control doors such that rotation of each one of the plurality of door gears actuates a different one of the plurality of airflow control doors to control airflow through the HVAC system; and
   a selector gear adjustable to create a connection between a power gear and each one of the plurality of door gears, directly or indirectly, to selectively actuate different ones of the plurality of airflow control doors;
   wherein the plurality of airflow control doors includes a first plurality of airflow control doors that control airflow through first airflow zones, a second plurality of airflow control doors that control airflow through second airflow zones, a third plurality of airflow control doors that control airflow through third airflow zones, and a fourth plurality of airflow control doors that control airflow through fourth airflow zones; and
   wherein the selector gear is movable 360° around the power gear, in a planetary arrangement.

2. The HVAC system of claim 1, wherein the plurality of airflow control doors includes a plurality of temperature control doors and a plurality of airflow volume control doors.

3. The HVAC system of claim 2, wherein one of the plurality of temperature control doors regulates temperature of defrost airflow and one of the plurality of airflow volume control doors regulates volume of defrost airflow.

4. The HVAC system of claim 1, further comprising a selector plate:
   wherein the selector gear is mounted to the selector plate, the selector plate is movable to move the selector gear to different ones of the plurality of door gears in a planetary arrangement.

5. The HVAC system of claim 4, further comprising a selector servo that rotates the selector plate, or drives the selector gear to move the selector plate along the path.

6. The HVAC system of claim 4, wherein the selector plate includes an upper selector plate and a lower selector plate, the selector gear is mounted between the upper selector plate and the lower selector plate, in a planetary arrangement.

7. The HVAC system of claim 4, wherein:
   the selector plate includes an annular flange defining openings therethrough; and each one of the plurality of door gears includes a locking feature extending towards the annular flange;

wherein the locking feature of the one of the plurality of door gears that the selector gear is engaged with aligns with the openings defined by the annular flange to permit rotation of the one of the plurality of door gears that the selector gear is engaged with; and wherein the flange extends between the locking feature of the plurality of gears that the selector gear is not engaged with to prevent rotation of the plurality of gears that the selector gear is not engaged with.

8. The HVAC system of claim 7, wherein each one of the plurality of door gears includes a base extending along an axis of rotation of the door gear and including the locking feature.

9. The HVAC system of claim 1, further comprising a power servo that rotates the power gear.

10. The HVAC system of claim 1, wherein the HVAC system includes a plurality of concentric door shafts, each one of the concentric door shafts includes one of the plurality of airflow control doors.

11. The HVAC system of claim 1, wherein the plurality of door gears surround the selector gear and the power gear, in a planetary arrangement.

12. The HVAC system of claim 1, further comprising a case, the case including an evaporator, a heater core, the plurality of airflow control doors, the plurality of door gears, the selector gear, and the power gear.

* * * * *